United States Patent [19]
van Eeden et al.

[11] 3,975,605
[45] Aug. 17, 1976

[54] PARTICULATE MATERIAL SUPPLY DETECTORS

[75] Inventors: Stephanus Jacobus Daniël van Eeden; Jacobus Francois Pienaar, both of Sasolburg, Orange Free State, South Africa

[73] Assignee: South African Coal, Oil & Gas Corporation Limited, Sasolburg, Orange Free State, South Africa

[22] Filed: May 19, 1975

[21] Appl. No.: 578,892

[30] Foreign Application Priority Data
May 20, 1974 South Africa............... 74/3203

[52] U.S. Cl. ............................................ 200/61.21
[51] Int. Cl.² ...................................... H01H 35/00
[58] Field of Search .............. 222/56, 64; 200/61.21

[56] References Cited
UNITED STATES PATENTS

| | | | |
|---|---|---|---|
| 2,611,044 | 9/1952 | Siemon | 200/61.21 |
| 2,640,361 | 6/1953 | Scray, Sr. | 200/61.21 X |
| 2,745,920 | 5/1956 | Keephart | 200/61.21 |
| 3,148,253 | 9/1964 | Carter | 200/61.21 |
| 3,818,159 | 6/1974 | Evans et al. | 200/61.21 |

*Primary Examiner*—Stanley H. Tollberg
*Attorney, Agent, or Firm*—Young & Simpson

[57] ABSTRACT

A particulate material supply detector including a sensor element arranged to be located in particulate material in a compartment and to be displaceable by movement of the particulate material past the sensor element, the position of the sensor element being dependent on the supply of particulate material in the compartment; and actuating means operatively connected to the sensor element and arranged to perform a required operation when a predetermined minimum supply is reached.

9 Claims, 2 Drawing Figures

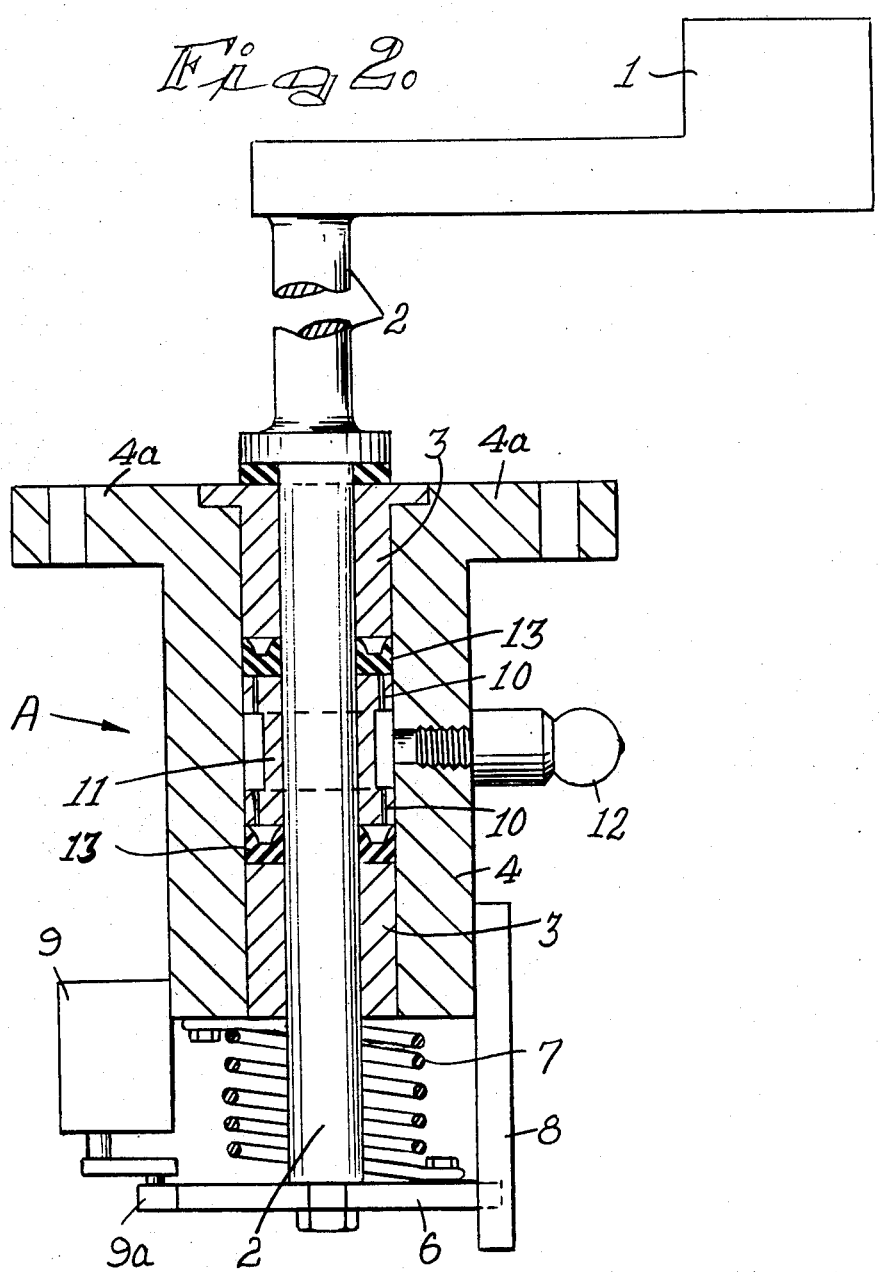

PARTICULATE MATERIAL SUPPLY DETECTORS

This invention relates to particulate material supply detectors.

For the purposes of this invention, the term "particulate material" is used to signify any material comprising discrete particles which can be stored, contained or handled in batches or in bulk form. The particle size may lie between wide limits. Thus, the term includes not only material or relatively small particle size, such as powdered or granular material, but also material of relatively large particle size, such as coal or the like.

It is known to feed coal to a pressure gasifier by means of a double lock arrangement. In order to ensure that as much coal as possible can be fed to the gasifier per unit time, it is necessary to know timeously when the coal lock hopper is empty. Several methods have been suggested for detecting an empty state of a coal lock hopper. In one method, a radioactive source and accompanying equipment is used, but the use of radioactivity suffers from obvious disadvantages. It has also been suggested to use a conventional level controller torque tube, but this arrangement is not reliable and requires excessive maintenance.

It is accordingly an object of the present invention to provide improved supply detecting means.

According to the invention a particulate material supply detector includes a sensor element arranged to be located in particulate material in a compartment and to be displaceable by movement of the particulate material past the sensor element, the position of the sensor element being dependent on the supply of particulate material in the compartment; and actuating means operatively connected to the sensor element and arranged to perform a required operation when a predetermined minimum supply condition is reached.

In a preferred embodiment of the invention, the sensor element is arranged to be resiliently biassed towards a starting position from which it is displaceable against the action of the bias by movement of the particulate material past the sensor element; and the actuating means is operatively connected to the sensor element to perform the required operation when the sensor element is biassed back towards its starting position from a displaced position when all the material in the compartment has moved past the sensor element.

With the arrangement of the previous paragraph, the sensor element is returned automatically from a displaced position towards its starting position in readiness for a new supply of material, once the previous supply has moved past the sensor element. An indication is obtained that the predetermined minimum supply condition has been reached, when all the material in the compartment has moved past the sensor element and the latter is biassed back towards its starting position.

The predetermined minimum supply condition at which the actuating means performs the required operation may comprise a condition when the compartment is substantially empty.

The actuating means may be arranged to give an aural and/or visual indication when the predetermined minimum supply condition has been reached. Additionally or alternatively, the actuating means may be arranged to perform any other required operation, such as to shut off machinery and/or to initiate the feeding of a fresh supply of particulate material to the compartment or otherwise to control the supply of particulate material to the compartment when the predetermined minimum supply condition has been reached.

The sensor element may be arranged to be rotatably mountable and may be in the form of a vane.

At least part of the actuating means may be arranged to be rotatable with the sensor element.

In a preferred embodiment, the sensor element is attached to a rotatable spindle arranged to pass through a wall of the compartment; and the actuating means is arranged to be operatively associated with the spindle on the outside of the compartment.

The actuating means may include a cam attached to the spindle for rotation therewith and operative to act on a follower in dependence on the circumferential position of the sensor element.

The follower may comprise operating means of electrical switch means, such as the operating mechanism of a microswitch. The switch means may be arranged to initiate any required operation, such as a visual and/or aural warning that the predetermined minimum supply condition has been reached.

For a clear understanding of the invention a preferred embodiment will now be described by way of example with reference to the accompanying drawings in which:

FIG. 2 is a sectional view to an enlarged scale of the supply detector of FIG. 1.

Figure 1:
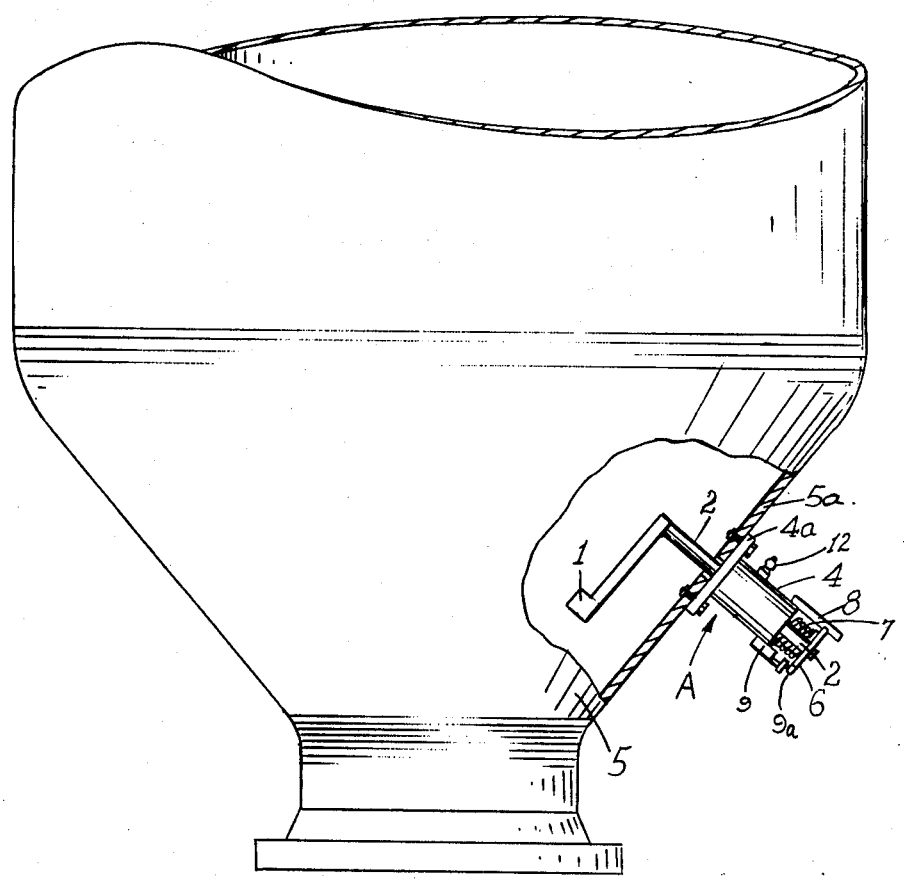
FIG. 1 is a diagrammatic elevational view of part of a coal lock hopper for a coal pressure gasifier, with parts broken away to show a supply detector according to the invention installed in the wall of the hopper.

The supply detector A comprises sensor element 1 which is in the form of a vane and is eccentrically mounted on spindle 2 for rotation therewith. Spindle 2 passes through wall 5a of coal lock hopper 5 and is rotatably carried in brass bushes 3 located in sleeve 4 which is adapted to be secured to the outside of wall 5a by means of screws or bolts passing through flange 4a on the end of sleeve 4. Sensor element 1 is adapted to be located in the interior of coal lock hopper 5 with spindle 2 extending to the exterior of the hopper to actuating means located on the outside of the hopper.

The actuating means includes cam 6 which is mounted on the outer end of spindle 2 for rotation therewith. Biassing spring 7 is located about spindle 2 and is attached at opposite ends to sleeve 4 and cam 6. Biassing spring 7 acts to bias sensor element 1 towards an extreme starting position in which the latter is located substantially horizontally in coal lock hopper 5, this extreme starting position being determined by contact of the periphery of cam 6 with stop member 8 on sleeve 4. When hopper 5 is filled with coal, sensor element 1 remains substantially horizontal in its starting position and is surrounded by coal particles.

When the bottom valve (not shown) of the lock hopper 5 opens, coal moves downwards past sensor element 1 and drags the latter down with it against the action of biassing spring 7 so that spindle 2 rotates and causes the periphery of cam 6 to rotate away from stop member 8.

Electrical micro-switch 9 is mounted on sleeve 4 and is provided with an operating mechanism including roller 9a. Micro-switch 9 is arranged to be operated when roller 9a is displaced and released.

The periphery of cam 6 is normally spaced from the actuating roller 9a of micro-switch 9 on sleeve 4 and as sensor element 1 is rotated downwardly away from its starting position, the periphery of cam 6 moves towards micro-switch roller 9a until it finally contacts the latter. When the coal in lock hopper 5 reaches a predetermined minimum level, i.e., at the point where all the coal has moved past sensor element 1, biassing spring 7 returns sensor element 1 to its extreme starting position and rotates the periphery of cam 6 away from micro-switch roller 9a to cause operation of micro-switch 9. Operation of micro-switch 9 causes a warning light or aural alarm (not shown) to be switched on to give an indication that lock hopper 5 is empty.

It will be appreciated that many variations in detail are possible without departing from the spirit of the invention. Thus, a spacer 11 with grease holes 10 communicating with grease nipple 12, may be provided between brass bushes 3. Neoprene seals 13 may be provided at opposite ends of spacer 11. Alternatively or additionally to the operation of micro-switch 9 causing a warning light or aural alarm to be switched on, it may initiate the feeding of a fresh supply of coal to lock hopper 5.

It will be appreciated that by suitable selection of the position of supply detector A above the bottom of lock hopper 5, the predetermined minimum level at which all the coal moves past sensor element 1 and the latter is released so that it is biassed back towards its extreme starting position to cause operation of micro-switch 9 and switch on a warning light and/or initiate any other required operation, may be arranged to suit particular requirements.

We claim:

1. A hopper for particulate material including means for detecting when a supply of particulate material in the hopper falls below a predetermined minimum level, the detecting means comprising a sleeve located outside the hopper and secured with its one end against the outside of the hopper; a spindle located axially in the sleeve and rotatably mounted in the sleeve for rotation about its own axis relative to the sleeve; a first end of the spindle projecting into the hopper from the end of the sleeve located against the hopper; a sensor element in the form of a vane fast with and extending transversely in one direction only from the first end of the spindle, the sensor element being rotatable with the spindle about the axis of the spindle between a starting position and a displaced position; means resiliently biasing the sensor element towards the starting position, the sensor element being rotatable with the spindle against the action of the biasing means from the starting position towards the displaced position by movement of material in the hopper past the sensor; a second end of the spindle projecting from the opposite end of the sleeve; a cam mounted on the second end of the spindle for rotation with the spindle; electrical switch means which is operable under the influence of the cam when the sensor element is rotated to the displaced position by movement of material past the sensor and then allowed to be biased back towards the starting position when all the material has moved past the sensor; and pressure sealing means within the sleeve between the sleeve and the spindle.

2. A hopper as claimed in claim 1, said resiliently biasing means comprising a coiled biasing spring located about the second end of the spindle and anchored between the sleeve and the spindle resiliently to bias the sensor element toward the starting position.

3. A hopper as claimed in claim 1, said pressure sealing means comprising at least one pressure sealing ring located about the spindle between the spindle and the sleeve.

4. A hopper as claimed in claim 2, said biasing spring being located between the cam and the end of the sleeve which is opposite said one end of the sleeve.

5. Means for detecting a minimum supply condition in a particulate material compartment, comprising a sleeve; a spindle located axially in the sleeve and rotatably mounted in the sleeve for rotation about its own axis relative to the sleeve, the spindle projecting at opposite ends from the sleeve; a sensor element in the form of a vane fast with and extending transversely in one direction only from one end of the spindle, the sensor element being rotatable with the spindle about the axis of the spindle between a starting position and a displaced position; means resiliently biasing the sensor element towards the starting position, the sensor element being rotatable with the spindle against the action of the biasing means from the starting position towards the displaced position; a cam mounted on the other end of the spindle for rotation with the spindle; electrical switch means operable under the influence of the cam when the sensor element is rotated to the displaced position and allowed to be biased back towards the starting position; and pressure sealing means within the sleeve between the sleeve and the spindle.

6. Means as claimed in claim 5, said resiliently biasing means comprising a coiled biasing spring located about the second end of the spindle and anchored between the sleeve and the spindle resiliently to bias the sensor element toward the starting position.

7. Means as claimed in claim 5, said pressure sealing means comprising at least one pressure sealing ring located about the spindle between the spindle and the sleeve.

8. Means as claimed in claim 7, and a pair of bushes located in the sleeve toward opposite ends thereof and rotatably carrying the spindle, the sealing ring being located between said bushes.

9. Means as claimed in claim 6, the coiled biasing spring being located between the cam and the end of the sleeve which is opposite said one end of the sleeve, the spindle being rotatably carried in a pair of bushes located in the sleeve toward opposite ends thereof, and said pressure sealing means comprising a sealing ring located between said bushes.

* * * * *